Dec. 19, 1933.    B. S. FUESS ET AL    1,939,970
THERMOSTATIC CONTROLLED MIXING VALVE
Filed Jan. 7, 1933    2 Sheets-Sheet 1
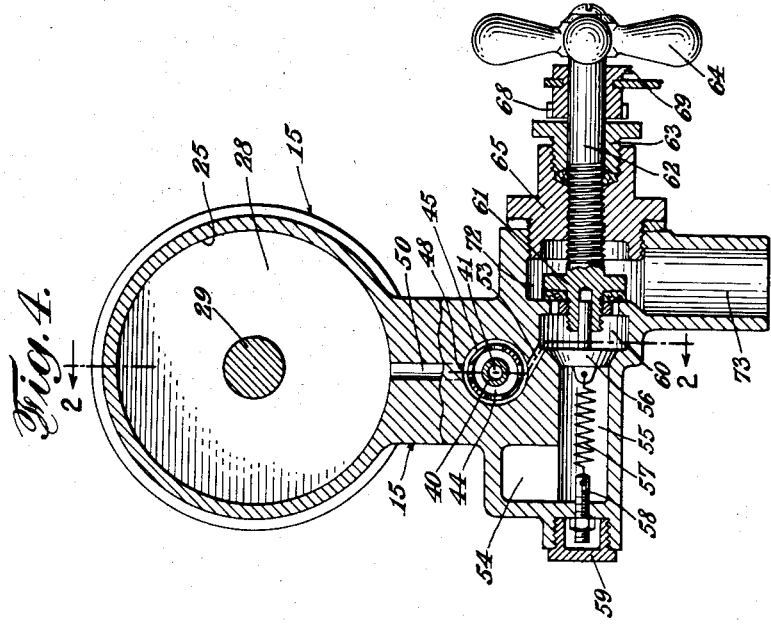
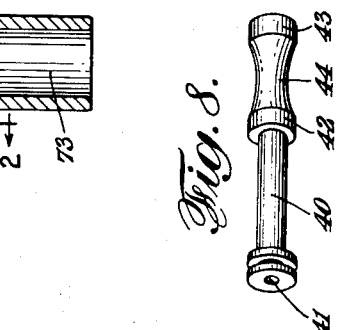
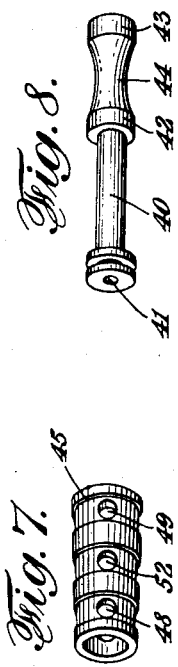
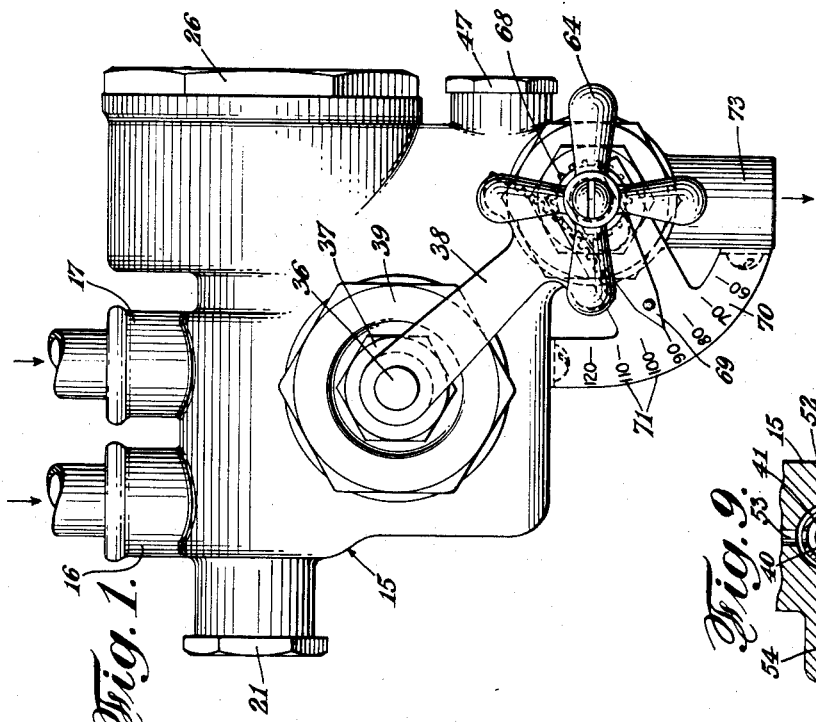
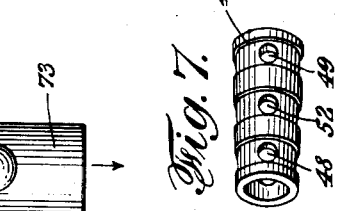
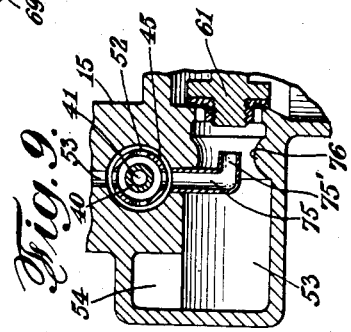
INVENTORS
Billings S. Fuess
James T. Sibley.
BY Warren E. Willis
their ATTORNEY

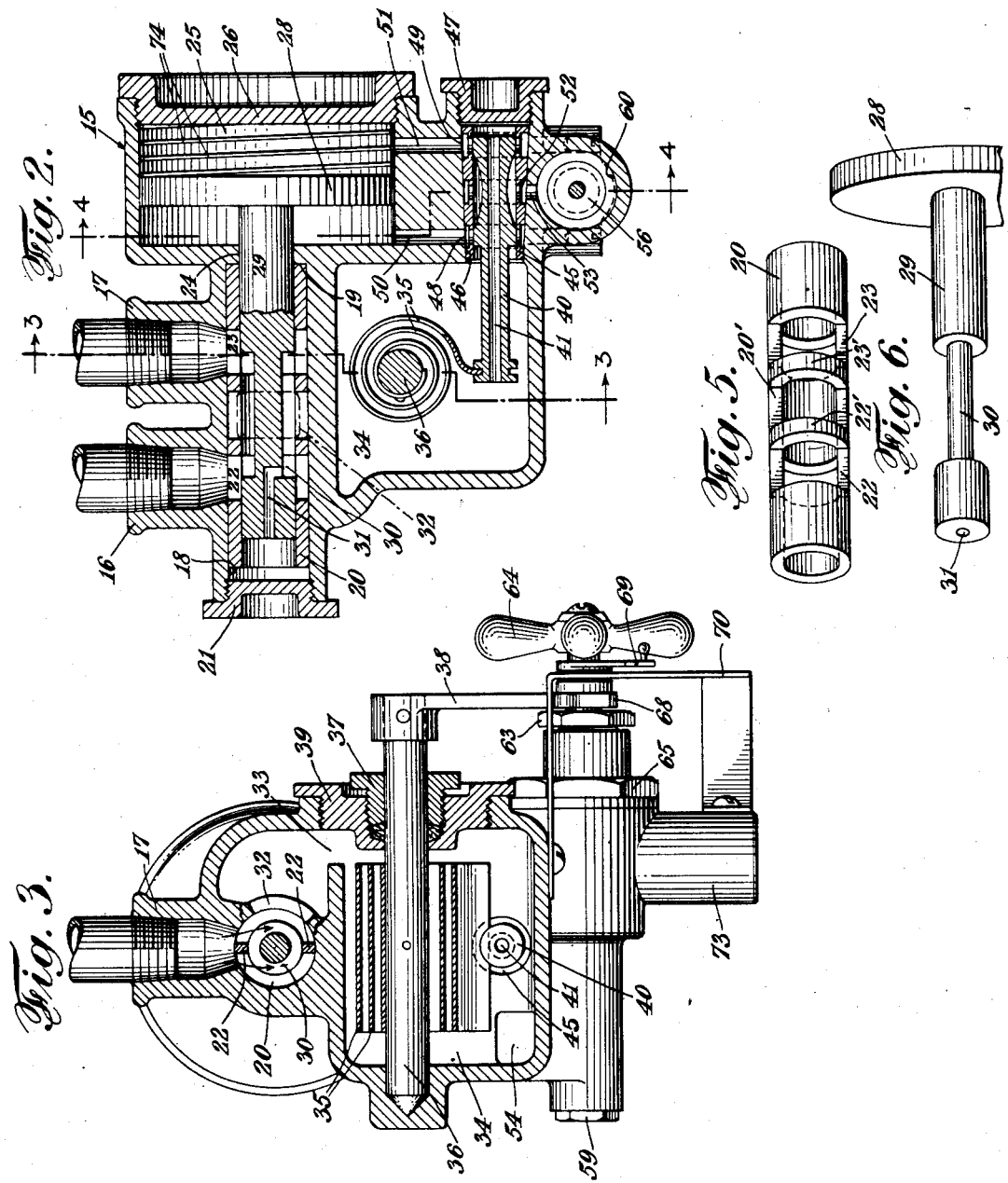

Patented Dec. 19, 1933

1,939,970

UNITED STATES PATENT OFFICE 1,939,970

THERMOSTATIC CONTROLLED MIXING VALVE

Billings S. Fuess, West Orange, N. J., and James T. Sibley, New Dorp, Staten Island, N. Y.

Application January 7, 1933. Serial No. 650,648

16 Claims. (Cl. 236—12)

This invention relates to thermostatically controlled mixing valves by which the flow of two streams of liquids of different temperatures are automatically regulated to produce a single effluent of required calorific content.

One of the objects of the invention is to provide a valve to mix hot and cold water, entering the valve through different orifices, whereby the discharge may be delivered at a predetermined temperature regardless of pressure or temperature of the incoming steams.

A further feature is in the provision of a novel regulating means which include a balanced plunger valve actuated by currents dominated by an auxiliary piston valve operated directly by a thermostat disposed in the mixing chamber and manually adjustable to the required temperature, the valve having a wide range of performance.

Another purpose is to produce a compact mixing valve arranged to occupy a minimum of space and in which are simple elements, easily assembled, effective in operation and capable of long continued use.

These advantageous objects are accomplished by the novel design, construction and combination of parts hereinafter described and shown in the accompanying drawings, constituting an important portion of this disclosure, and in which:—

Figure 1 is a top plan view of an embodiment of the invention.

Figure 2 is a sectional view taken on line 2—2 of Figure 4.

Figure 3 is a transverse sectional view taken on line 3—3 of Figure 2.

Figure 4 is a similar sectional view taken on line 4—4 of Figure 2.

Figure 5 is a perspective view of the plunger valve sleeve in detail.

Figure 6 is a similar view of the combined plunger valve and piston.

Figure 7 is a detail perspective view of auxiliary valve sleeve.

Figure 8 is a similar view of the auxiliary or pilot valve in detail.

Figure 9 is a fragmentary sectional view, similar to Figure 4 but showing a modification in construction.

The valve is designed primarily to control the flow of water for bathing purposes, whereby setting the indicator to the temperature desired, the water will be discharged at the temperature required irrespective of variations in the service pipe.

While adapted especially for shower bath use, the invention obviously may be utilized for mixing fluids of different degrees of temperature and maintain the delivery at a substantially uniform temperature.

Referring now in greater detail to the drawings, the numeral 15 designates in general the body of the valve having inlets 16—17 for hot and cold fluids respectively, these inlets being connected with service supply pipes in the usual manner.

The body has a bore 18, terminating in a shoulder 19, to which is tight fitted a sleeve 20, the bore being closed by a cap screw 21 at its outer end, and the sleeve provided with transverse ports 22—23, registering with the inlets 16—17, these ports being preferably formed by cutting the sleeve from opposite sides to leave narrow connections between its central and end portions.

A small bore 24, equal in size to the opening in the sleeve 20, leads to a piston chamber 25, concentric with the sleeve, and provided with a cap 26.

Movable in the chamber is a piston 28, integral with a plunger valve 29 slidable through the bore 24, and also in the sleeve 20, this valve having an elongated annular recess 30 adapted to control the inlet ports 22—23 so that either may be opened or closed to the desired extent. A by-pass 31 leads from the recess to the space at the outer end of the sleeve.

The ports 22—23, at their inner ends, are open to other ports 32—33, leading to a mixing chamber 34 in which is an openly coiled, bi-metallic thermostat 35, its inner-end being fixed on a spindle 36 journalled at one end in the wall of the chamber and passing out through a stuffing box 37 at the other end to which is secured a gear segment 38, the purpose of which will later appear.

The stuffing box 37 is set in a cap 39 fixed in the valve body and of such dimensions as to permit assemblage of the thermostat within the mixing chamber 34.

The outer, free end of the thermostatic coil 35, both edges of which are spaced from the wall of the chamber, and its cap 39, connects with the inner end of a regulator or pilot valve 40 having an axial passage 41 and arranged substantially parallel with the main control valve 29.

The outer portion of the valve 40 is shaped to present two enlarged short cylindrical heads 42—43, between which is an annular recess 44 of arcuate profile, the heads being slidable in a sleeve 45, preferably tapered as shown and fixed in a corresponding bore 46 in the body, the bore being sealed by a plug 47.

The sleeve 45 contains ports 48—49 alined with ducts 50—51 leading to the piston chamber 25 and entering it at its opposite ends at the respective sides of the piston 28.

Another port 52, centrally of the sleeve 45 and communicating with an outlet 53, provides means to drain the space between the heads 42—43, while the passage 41 allows fluid to pass from the mixing chamber 34 to the space at the outer end of the valve head, thereby balancing the valve.

An opening 54 allows fluid from the mixing chamber 34 to enter a compartment 55 controlled by a check valve 56, drawn by a spring 57 against its seat, the spring being adjustable by a threaded connection 58, accessible upon removing a cap 59 engaged in a nipple formed on the valve body.

When the check valve 56 is raised the water passes into a chamber 60, controlled by a valve 61 carried by a stem 62 passing outwardly of the body through a stuffing box 63 and provided with a manually operable handle 64. The stuffing box 63 is set in a shouldered sleeve 65 fixed in the body 15 and is bored and tapped to guide and actuate the valve stem 62 when rotated by its handle.

The lower end of the stem 62 is bored to act as a guide for the stem of the check valve 56 as indicated, and the by-pass 53 allows entrained water to escape from the auxiliary valve 40 to the chamber 60.

Rotatably mounted on the valve stem 62, beyond the stuffing box 63, is a pinion 68 meshing with the segment 38, and carried on the hub of the pinion is a pointer arm 69 operable over an index 70 bearing a scale 71 relative to the temperature desired to obtain.

When the handled outlet valve 61 is opened the force of current, entering the compartment 55, raises the check valve 56, entering the chamber 60 to pass into a space 72 and thence outwardly through the discharge 73 as may be required.

In the operation, the valve elements being in the position seen in Figure 2, fluid from the inlets passes the ports 22—23, past the valve recess 30 and ports 32—33 into the mixing chamber 34.

Here, if the mixture is hotter than the thermostatic scale 70 is set for, the thermostat expands in a well known manner, moving the control valve 40 inwardly, while the fluid passes through the passage 41 and, due to the position of the valve at that time, enters the port 49 thence by duct 51 to the chamber 25 to press the piston 28 inwardly, thereby partially or wholly closing the hot fluid port 23 and further opening the cold fluid port 22.

Conversely, if the mixture is too cold a reverse action takes place as will be readily understood.

As the fluid passes between and around the coils of the thermostat 35, the action is sensitive to minute changes in temperature and obviously the thermostat may be adjusted closely to requirements by moving the index 69 relative to its fixed scale 70.

In the modification shown in Figure 9, the check valve and its adjuncts are omitted, and in place a tube 75 is fixed in the body 15 opposite one of the auxiliary valve sleeve ports 52, the extending end of the tube being bent and directed towards the valve 61 which it closely approaches.

It is also to be noted that a light coiled spring 74 may be used to balance the valve 29, preferably between its piston 28 and cap 26, the spring being opposed to the pressure of fluid at the inner end of the valve, also that the several caps and other removable parts are provided with suitable packings.

The instrument will work without the check valve 56 if instead there be a restriction at this point, for due to the rush of water past the outlet 53 a vacuum is formed thus causing a difference in pressure between chambers 60 and 55.

As changes of construction could be made within the scope of the invention, it is intended that all matter contained in the foregoing description or shown in the accompanying drawings shall be interpreted as illustrative and not in a limiting sense.

Having thus described the invention, what is claimed, as new and desired to secure by Letters Patent, is:—

1. An automatic mixing valve comprising a unitary body having a mixing chamber and a dispensing chamber in communication therein, inlets for liquids of different temperature to said mixing chamber, a balanced valve controlling both inlets, an outlet for said dispensing chamber, a manually operable valve controlling said outlet, a spirally coiled thermostat in said mixing chamber, a stem to which the inner coil of said thermostat is secured, means to turn said stem in either direction and means actuated by said thermostat to operate said balanced valve.

2. An automatic mixing valve comprising a body having a mixing chamber and a dispensing chamber, hot and cold water inlets to said mixing chamber, a single valve controlling both inlets, a piston combined with the inlet valve, ports in said body leading from the mixing chamber to opposite sides of said piston, a single valve controlling both ports, a thermostat in said mixing chamber to actuate the last named valve, means for modifying the action of said thermostat, and a dial by which said modifying means may be regulated.

3. An automatic mixing valve comprising a body having communicating mixing and dispensing chambers, inlets for hot and cold water respectively to the mixing chamber, a balanced valve controlling both inlets, an outlet for the dispensing chamber, a manually operable valve controlling the outlet, a check valve between said chambers, a piston combined with said balanced valve, ducts open to the mixing chamber, said ducts leading to opposite sides of said piston, a balanced piston valve controlling both ports, and a thermostat in the mixing chamber operatively connected with said piston valve.

4. In an automatic mixing valve having a plurally chambered body, one chamber to receive hot and cold liquids from independent sources and the other chamber having a valve controlled outlet, a single valve controlling both of the liquid inlets, another chamber in communication with the first chamber and having a valve controlled outlet, a thermostat in the receiving chamber, means to adjust said thermostat to the temperature required in the second chamber, and means operated by said thermostat to actuate said inlet valve whereby the entering liquids are proportioned and comingled to produce a uniform mixture of the desired temperature.

5. In an automatic mixing valve having a plurally chambered body, one chamber to receive hot and cold liquids from independent sources and the other chamber having a valve controlled outlet, said chambers being in communication, means to control the inlets to the first named chamber, said means including a valve having a piston at one end and a liquid supply to the piston from the first chamber, a thermostat in the receiving chamber to control the action of said piston, a stem on which the thermostat is mounted, a lever to rotate said stem, and a dial index by which the position of said lever may be controlled, said index being graduated to represent the degrees of heat of the liquid in the discharge chamber.

6. In a mixing valve, a casing having inlets for fluids of different temperatures, a mixing chamber in said casing, a single valve controlling said inlets, an auxiliary valve controlling current from said mixing chamber to actuate said single valve in accordance with the temperature of fluid in the mixing chamber, thermally controlled means in said mixing chamber to actuate said auxiliary valve, and a manual operable valve to control the discharge from said mixing chamber.

7. In a mixing valve, a casing having inlets for fluids of different temperatures, a mixing chamber in said casing, a plunger valve controlling both inlets, a thermally controlled element in said mixing chamber to be acted upon by the combined fluids from said inlets, means to regulate said thermal element, an auxiliary valve actuated by the thermal element to direct streams from the mixing chamber to operate said plunger valve, an outlet from said chamber and a manual valve controlling said outlet.

8. In a mixing valve, a casing having inlets for fluids of different temperatures, a mixing chamber in said casing, a plunger valve controlling both inlets, a thermally controlled element in said mixing chamber to be acted upon by the combined fluids from said inlets, means to regulate said thermal element, a pilot valve operated by said thermal element, a piston combined with said plunger valve, and ducts leading from said mixing chamber to opposite sides of said piston, said ducts being controlled by said pilot valve.

9. In a mixing valve, a casing having separate inlets, a mixing chamber, a balanced plunger valve controlled both inlets to said chamber, a piston combined with said valve, a chamber in which said piston is movable, ports leading from said mixing chamber to opposite ends of the piston chamber, an auxiliary valve controlling said ports, a coiled thermostat in the mixing chamber connected to said auxiliary valve, a spindle on which said thermostat is fixed, a dial carried by said casing, a manually movable pointer over said dial, and operative connections between said pointer and said spindle whereby the resistance of said thermostat may be affected.

10. In a mixing valve, a casing having separate inlets, a mixing chamber, a balanced plunger valve controlling both inlets to said chamber, a piston combined with said valve, a chamber in which said piston is movable, ports leading from said mixing chamber to opposite ends of the piston chamber, an auxiliary valve controlling said ports, a coiled thermostat in the mixing chamber connected to said auxiliary valve, said thermostat being responsive to the temperature of fluids flowing through the chamber, manual means for modifying the action of the thermostat in accordance with the temperature required, and a single outlet from said mixing chamber having a manually controlled valve.

11. In a valve for mixing fluids of unlike temperatures, a casing having separate inlets, a mixing chamber, a plunger valve controlling both inlets, a piston combined with the valve, said valve being open at one end to the pressure in said chamber, a spring adapted to balance the pressure on said valve, passages leading to opposite sides of said piston, an auxiliary balanced valve controlling both passages, means in the auxiliary valve to release fluid from the side of said piston when under compression, and a thermal element in said chamber to actuate said auxiliary valve upon change of temperature of fluid therein other than that required.

12. In a valve for mixing fluids of unlike temperatures, a casing having separate inlets, a mixing chamber, a plunger valve controlling both inlets, a piston combined with the valve, said valve being open at one end to the pressure in said chamber, a spring adapted to balance the pressure on said valve, passages leading to opposite sides of said piston, an auxiliary balanced valve controlling both passages, said auxiliary valve being hollow and reduced in diameter between its heads, a coiled thermostat operatively connected with said auxiliary valve, said thermostat being responsive to changes in temperature of fluids in said mixing chamber, and means for modifying the action of said thermostat in conformity with the desired temperature of effluent from the mixing chamber.

13. In a mixing valve, a casing having a mixing chamber, separate inlets for fluids of different temperature to said chamber, a balanced plunger valve having a piston combined therewith, a chamber for said piston, said valve controlling flow through both inlets, ducts leading from said chamber to each side of said piston, an auxiliary valve having heads to control the piston actuating ducts whereby said plunger valve is moved, said ducts communicating with the mixing chamber, means in said auxiliary valve to release fluid in the piston chamber, thermostatic means in the mixing chamber to actuate said auxiliary valve, a single outlet for the mixing chamber, a check valve therein, and a manually operable valve controlling said outlet.

14. In a mixing valve having spaced parallel inlets respectively for hot and cold fluids, a chamber in which the fluids are commingled, a cylindrical plunger valve having a restricted portion movable to control both inlets, a disc-like head on said valve, a spirally coiled thermal element in said mixing chamber, and means actuated by the thermal element to operate said valve head whereby the proportions of hot and cold fluid entering the chamber are regulated.

15. In a mixing valve having spaced inlets respectively for hot and cold fluids, a chamber in which the fluids are commingled, a cylindrical plunger valve having a restricted portion movable to control both inlets, a by-pass at one end of said valve, a piston at the opposite end, ports leading from said chamber to deliver fluid to either side of said piston, a coiled thermostat in said chamber, and means actuated by the thermostat to control said ports.

16. In a mixing valve having spaced inlets respectively for hot and cold fluids, a chamber in which the fluids are commingled, a plunger valve to control both inlets, a piston chamber, a piston combined with said valve operative in the piston chamber, ports leading from the mixing chamber to enter said piston chamber at its opposite ends, a thermostat in the mixing chamber, a pilot valve having spaced heads controlling said ports, a restricted portion between said heads to receive fluid from the piston chamber when the piston is moved therein, means for balancing said pilot valve, and an operative connection between said thermostat and said pilot valve.

BILLINGS S. FUESS.
JAMES T. SIBLEY.